've
Patented Nov. 5, 1946

2,410,551

UNITED STATES PATENT OFFICE 2,410,551

ALLYL AND METHALLYL ESTERS OF LACTIC AND ALPHA-ACETOXYPROPIONIC ACIDS

Chessie E. Rehberg, Glenside, and Charles H. Fisher, Abington, Pa., assignors to United States of America, as represented by the Secretary of Agriculture No Drawing. Application December 8, 1944, Serial No. 567,294

4 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This is a continuation in part of our copending application for patent, Serial No. 474,757, filed February 4, 1943.

Our invention relates to new and useful allyl and substituted allyl esters of lactic and alpha-acetoxypropionic acids, namely, allyl lactate, beta-methallyl lactate (hereinafter referred to as "methallyl lactate"), beta-chloroallyl lactate, gamma-chloroallyl lactate, methyl vinyl carbinyl lactate, crotyl lactate, allyl alpha-acetoxypropionate, beta-methallyl alpha-acetoxypropionate (hereinafter referred to as "methallyl alpha - acetoxypropionate"), beta - chloroallyl alpha - acetoxypropionate, gamma - chloroallyl alpha-acetoxypropionate, methyl vinyl carbinyl alpha - acetoxypropionate, and crotyl alpha-acetoxypropionate, having the formulae:

allyl lactate

methallyl lactate

beta-chloroallyl lactate

gamma-chloroallyl lactate

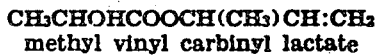
methyl vinyl carbinyl lactate

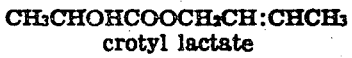
crotyl lactate

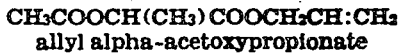
allyl alpha-acetoxypropionate

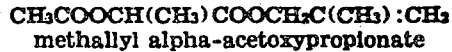
methallyl alpha-acetoxypropionate

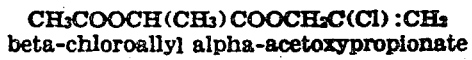
beta-chloroallyl alpha-acetoxypropionate

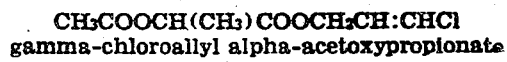
gamma-chloroallyl alpha-acetoxypropionate

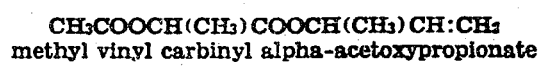
methyl vinyl carbinyl alpha-acetoxypropionate

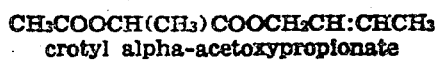
crotyl alpha-acetoxypropionate

The object of our invention is the production of compounds that are useful as solvents, plasticizers, insecticides, insect repellants, chemical intermediates and as starting materials in the production of allyl and substituted allyl acrylates which are substances polymerizable into plastic, semi-solid, or solid materials useful in industry because of their tensile strength, elasticity, plasticity, resistance to water, organic liquids and gases, and because of other desirable properties.

It is well known (Burns, Jones and Ritchie, J. Chem. Soc. 1935, 400–6, 714–7; Claborn, U. S. 2,222,363, Nov. 19, 1940; Claborn, U. S. 2,229,997, Jan. 28, 1941; Smith, Fisher, Ratchford and Fein, Ind. Eng. Chem. 34, 473–9 (1942)) that methyl alpha-acetoxypropionate can be decomposed thermally to yield as a principal product methyl acrylate, which can be converted by polymerization into substances useful in the plastics and related industries. However, the alkyl alpha-acetoxypropionates of higher molecular weight have been observed to be unsuitable for production of the corresponding alkyl acrylates because of the preponderance of undesirable reactions which lead to the formation of products other than the acrylates, and because the alkyl acrylates formed yield polymers which lack the properties considered desirable in industry.

We have found that the presence of an olefin linkage between the beta and gamma carbon atoms of the alkoxy group decreases the undesirable side reactions encountered in the pyrolysis of the alkyl alpha-acetoxypropionates of higher molecular weight, and that, owing to the characteristics of the allyl and substituted allyl radicals and their esters, their alpha-acetoxypropionates can be converted readily and in good yields into allyl and substituted allyl acrylates (as shown below), which can be polymerized and interpolymerized into materials useful in industry.

$$CH_3COOCH(CH_3)COOC(R)_2C(R):C(R)_2 \xrightarrow{Pyrolysis}$$

Allyl or substituted allyl
alpha-acetoxypropionate $$CH_2:CHCOOC(R)_2C(R):C(R)_2$$ (where R is hydrogen, a halogen or an alkyl group)

Allyl or substituted allyl acrylate

Thus we have found that allyl, methallyl, chloroallyl (of the beta and gamma variety), methyl vinyl carbinyl, and crotyl lactates, and allyl, methallyl, chloroallyl (of the beta and gamma variety), methyl vinyl carbinyl, and crotyl alpha-acetoxypropionates are new and useful compounds, which are solvents and plasticizers, and which are readily convertible into the corresponding acrylates and polymers and interpolymers thereof.

Allyl lactate can be made by the interaction of lactic acid and allyl alcohol or by treating metallic salts of lactic acid with an allyl halide. Methallyl lactate can be made from lactic acid and methallyl alcohol by esterification, from an alkyl lactate, such as methyl or ethyl lactate and methallyl alcohol by alcoholysis, or from a metal lactate, such as sodium lactate, and a beta-methallyl halide. Methyl vinyl carbinyl, beta-chloroallyl, and crotyl lactates are prepared by the interaction of lactic acid and the respective alcohols, while gamma-chloroallyl lactate can be conveniently prepared by the action of gamma-chloroallyl alcohol or methyl lactate.

Allyl and methallyl alpha-acetoxypropionates can be prepared from allyl and methallyl lactates, respectively, by acetylation with any of the common acetylating agents, such as acetic anhydride. They can also be prepared by treating alpha-acetoxypropionyl chloride or alpha-acetoxypropionic anhydride with allyl and methallyl alcohol, respectively. Beta-chloroallyl, gamma-chloroallyl, methyl vinyl carbinyl, and crotyl alpha-acetoxypropionates can be conveniently prepared by treating the corresponding lactates with an acetylating agent such as acetic anhydride.

The following are several examples of the invention:

*Example I.*—Two moles (180.2 g.) of essentially 100 percent lactic acid, 2.2 moles (127.8 g.) of allyl alcohol, 200 cc. of benzene and 3 cc. of concentrated sulfuric acid were refluxed three hours while water was continuously removed as formed by use of a trap. Benzene and unreacted allyl alcohol were removed by distillation under about 20 mm. pressure, after which allyl lactate was distilled under 1 mm. pressure, its boiling point under this pressure being 27–29° C. The yield was 88 g., or 34 percent of the theoretical. More of the ester, allyl lactate, was obtained by adding allyl alcohol, benzene and acid catalyst to the distillation residue, refluxing and then distilling the reaction mixture as before.

*Example II.*—Two moles (180.2 g.) of essentially 100 percent lactic acid was dehydrated by refluxing with benzene, a trap being used to remove water. After complete removal of water (34 cc.), 6 moles of allyl alcohol was added and the mixture was refluxed several hours. The benzene and excess alcohol were then removed by fractional distillation, the final stage being carried out under a pressure of about 20 mm. The allyl lactate was then distilled at 60° C. under 7 mm. pressure, 45 g. being obtained. The recovered alcohol was returned to the reaction vessel containing the distillation residue, 1–2 g. of p-toluenesulfonic acid was added, and the mixture again refluxed for several hours. Upon distillation, 159 g. of allyl lactate was obtained. The total yield was thus 204 g., or 78 percent of the theoretical. The residue (presumably polylactic acid) could doubtless be used again or added to a new batch of material, thus eventually converting virtually all of it into ester.

Allyl lactate is a clear, colorless, mobile liquid at room temperature with a mild and not unpleasant odor; boiling at 60° C. under 7 mm. of mercury pressure, 79° C. under 25 mm., and 175.5° C. under 754 mm. pressure; having a specific gravity of 1.0452 at 20° C., and having a refractive index for the yellow sodium line of 1.4369 at 20° C.

*Example III.*—Using essentially the same procedure as in Example I, there was obtained from 3 moles (270 g.) of lactic acid and 3.3 moles (238 g.) of beta-methallyl alcohol 143 g. of ester, this being 33 percent of the theoretical amount. As before, more of the ester was obtained by treating the distillation residue with beta-methylallyl alcohol, refluxing and distilling.

*Example IV.*—Five moles (450 g.) of lactic acid and 5.5 moles (396 g.) of beta-methallyl alcohol were treated as in Example I, the yield of ester being 212 g. The recovered alcohol was then returned to the reaction flask containing the lactic acid residue and refluxed for several hours. Distillation then gave 115 g. of ester. A third period of reflux of alcohol and lactic acid residue yielded 39 g. of ester, a fourth yielded 34 g., and a fifth, 16.6 g. Addition of 50 cc. of fresh alcohol and 1 cc. of phosphoric acid raised the yield in the sixth period to 29 g. A further addition of 100 cc. of alcohol gave a yield of 14 g. in the final reaction period, the total yield being 460 g., or 64.6 percent of the theoretical. The product was collected at 77–79° C. under 11 mm. pressure.

Beta-methallyl lactate is a clear, colorless, mobile liquid at room temperature, with mild odor; having boiling points of 69° C. under 8 mm. and 78° C. under 11 mm. of pressure; having a specific gravity of 1.0181 at 20° C., and having a refractive index for the yellow sodium line of 1.4389 at 20° C.

*Example V.*—To 1.5 moles (195 g.) of allyl lactate there was slowly added, with stirring, 1.65 moles (168 g.), 10 percent excess, of acetic anhydride. The mixture was warmed to 50–60° C. to start the reaction, after which cooling was used to keep the temperature below 100–110° C. After standing an hour, the mixture was fractionated under a pressure of 7 mm., the product being collected at 80–81° C. The yield was 230 g., or 89 percent of the theoretical.

Allyl alpha-acetoxypropionate is a clear, colorless, mobile liquid of slight, though pleasant, odor; having a boiling point of 81° C. under 7 mm.; having a specific gravity of 1.0544 at 20° C.; and having a refractive index for the yellow sodium line of 1.4270 at 20° C.

*Example VI.*—Using essentially the procedure described in Example V, except that 1–2 cc. phosphoric acid was used as a catalyst and the temperature was maintained at 60–80° C., there was obtained from 1.5 moles of beta-methallyl lactate and 1.8 moles of acetic anhydride a yield of 260 g. of beta-methallyl alpha-acetoxypropionate, this being 93 percent of the theoretical yield. The product was collected at 100–102° C. at 12 mm. pressure.'

Beta-methallyl alpha-acetoxypropionate is a clear, colorless, mobile liquid with a slight, pleasant odor; having boiling points of 76° C. under 3 mm., 87° C. under 5 mm., and 95° C. under 10 mm. pressure; having a specific gravity of 1.0330 at 20° C., and having a refractive index for the yellow sodium line of 1.4314 at 20° C.

*Example VII.*—Aqueous sodium lactate (84.5 g. of 64 percent by weight sodium lactate) and 67.8 g. of beta-methallyl chloride were heated in a rocking stainless steel autoclave at 120–180° C. for 5 hours. A moderate yield of methallyl lactate was obtained by fractional distillation of the reaction mixture.

*Example VIII.*—Ten moles (1125 g.) of 80 percent lactic acid, 400 ml. benzene, and 5 ml. of sulfuric acid were refluxed in a still having a 3-ft. column fitted with a water trap at its top, water being drawn off, as it collected, at the rate of about 300 ml. in about 5 hours. When production of water became slow, 40 moles (2323 g.) of allyl alcohol were added and refluxing continued with removal of about 220 cc. of water, containing some allyl alcohol, in about 20 hours. When no more water was produced, the flask was cooled, 20 g. of anhydrous sodium acetate was added to neutralize the sulfuric acid, and the benzene and about half the excess allyl alcohol were distilled at atmospheric pressure. The remainder of the alcohol was then distilled fairly rapidly under about 50 mm. pressure, after which the allyl lactate was rapidly distilled at 60° C. and at 7 mm. The yield was 1178 g. or 90.5 percent of the theoretical.

*Example IX.*—Using the procedure described in Example VIII, lactic acid was interacted with beta-chloroallyl alcohol to give beta-chloroallyl lactate in 76 percent yield.

*Example X.*—The procedure of Example VIII was slightly modified to prepare methyl vinyl carbinyl lactate, since methyl vinyl carbinol is somewhat unstable in the presence of sulfuric acid. In this case, the lactic acid, alcohol, and benzene were mixed and refluxed with removal of water until little water was produced. Then, 10 g. of p-toluenesulfonic acid was added and heating continued. When no more water was produced, the catalyst was neutralized and the product distilled as described in Example VIII.

*Example XI.*—The same procedure as in Example X was followed to prepare crotyl lactate, since crotyl alcohol is also unstable in the presence of sulfuric acid.

*Example XII.*—Gamma-chloroallyl lactate was prepared by the alcoholysis of methyl or ethyl lactate. In this case 3 moles (312 g.) of methyl lactate, 6 moles (555 g.) of gamma-chloroallyl alcohol, and 10 g. of aluminum tert-butoxide were mixed and refluxed in a still from which methanol was withdrawn as fast as it collected at the still-head. When production of methanol ceased, the excess alcohol was distilled at 54° C. and at 13 mm., after which the product was obtained at 105° C. and at 12 mm. The yield of gamma-chloroallyl lactate was 65 percent of the theoretical.

*Example XIII.*—Using the procedure of Example XII, methallyl lactate was obtained by interacting methyl or ethyl lactate with methallyl alcohol. The yield of methallyl lactate was 70 percent.

*Example XIV.* — Beta-chloroallyl alpha-acetoxypropionate was prepared by interacting beta-chloroallyl lactate with acetic anhydride and then distilling to recover the ester.

*Example XV.*—Gamma-chloroallyl alpha-acetoxypropionate was prepared by reacting gamma-chloroallyl lactate and acetic anhydride.

*Example XVI.*—Methyl vinyl carbinyl alpha-acetoxypropionate was prepared by reacting methyl vinyl carbinyl lactate and acetic anhydride.

*Example XVII.* — Crotyl alpha-acetoxypropionate was prepared by reacting crotyl lactate with acetic anhydride.

The following table illustrates the properties of some of these compounds:

*Mono- and di-esters of lactic acid*

| Ester | Yield, percent | B. P., °C. | Press., mm. | $N_D^{20}$ | $d_4^{20}$ | Mol. refraction | | Sap. eq. | |
|---|---|---|---|---|---|---|---|---|---|
| | | | | | | Calcd. | Found | Calcd. | Found |
| ALKENYL LACTATES | | | | | | | | | |
| Beta-chloroallyl | 76 | 83 | 5 | 1.4627 | 1.2153 | 37.49 | 37.28 | 164.6 | 163.2 |
| Gamma-chloroallyl | 65 | 106 | 12 | 1.4670 | 1.2166 | 37.49 | 37.54 | 164.6 | |
| Crotyl | 83 | 92 | 18 | 1.4420 | 1.0106 | 37.24 | 37.75 | 144.2 | 149.3 |
| Methyl vinyl carbinyl | 77 | 58 | 8 | 1.4326 | 1.0091 | 37.24 | 37.10 | 144.2 | 144.5 |
| ALKENYL ALPHA-ACETOXYPROPIONATES [1] | | | | | | | | | |
| Beta-chloroallyl | 84 | 96 | 5 | 1.4460 | 1.1792 | 46.85 | 46.73 | 103.3 | 102.0 |
| Crotyl | 86 | 94 | 8 | 1.4347 | 1.0338 | 46.60 | 46.97 | 93.1 | 95.1 |
| Methyl vinyl carbinyl | 100 | 80 | 8 | 1.4256 | 1.0233 | 46.60 | 46.59 | 93.1 | 93.2 |

[1] Prepared by treating the corresponding alkenyl lactate with acetic anhydride.

Having thus described our invention, we claim:
1. Beta-chloroallyl alpha-acetoxypropionate.
2. Gamma - chloroallyl alpha - acetoxypropionate.
3. Methyl vinyl carbinyl alpha-acetoxypropionate.
4. A compound of the general formula

$$CH_3COOCH(CH_3)COO(X)$$

where (X) is a substituted allyl radical chosen from the group consisting of chloroallyl, crotyl and methyl vinyl carbinyl.

CHESSIE E. REHBERG.
CHARLES H. FISHER.